(12) United States Patent
Yan et al.

(10) Patent No.: US 12,439,068 B2
(45) Date of Patent: Oct. 7, 2025

(54) BILATERAL MATCHING BASED REFERENCE PICTURE REORDERING

(71) Applicant: BEIJING DAJIA INTERNET INFORMATION TECHNOLOGY CO., LTD., Beijing (CN)

(72) Inventors: Ning Yan, San Diego, CA (US); Yi-Wen Chen, San Diego, CA (US); Xiaoyu Xiu, San Diego, CA (US); Wei Chen, San Diego, CA (US); Che-Wei Kuo, San Diego, CA (US); Hong-Jheng Jhu, San Diego, CA (US); Han Gao, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/776,609

(22) Filed: Jul. 18, 2024

(65) Prior Publication Data
US 2025/0016348 A1 Jan. 9, 2025

Related U.S. Application Data

(63) Continuation of application No. PCT/US2023/010452, filed on Jan. 10, 2023.
(Continued)

(51) Int. Cl.
H04N 7/12 (2006.01)
H04N 19/105 (2014.01)
(Continued)

(52) U.S. Cl.
CPC ........... *H04N 19/44* (2014.11); *H04N 19/105* (2014.11); *H04N 19/159* (2014.11); *H04N 19/176* (2014.11)

(58) Field of Classification Search
CPC .................................................. H04N 19/159
See application file for complete search history.

(56) References Cited

U.S. PATENT DOCUMENTS

2019/0222848 A1  7/2019  Chen et al.
2020/0260102 A1  8/2020  Lin et al.
2021/0266529 A1  8/2021  Xu et al.

FOREIGN PATENT DOCUMENTS

WO    2020130617 A1    6/2020

OTHER PUBLICATIONS

International Search Report and Written Opinion in related PCT Application No. PCT/US2023/010452 dated May 4, 2023 (11 pages).
(Continued)

Primary Examiner — Y Lee
(74) Attorney, Agent, or Firm — Bayes PLLC

(57) ABSTRACT

Implementations of the disclosure provide video processing apparatuses and methods for inter-prediction. A video processing method for the inter-prediction performed by a video decoder includes determining a reference index for a video block in a video frame of a video from a bitstream. The video processing method also includes generating a joint list including a plurality pairs of reference pictures based on a first reference list and a second reference list for the video block. The video processing method further includes reordering the plurality pairs of reference pictures in the joint list based on bilateral matching using one or more motion vectors of the video block to generate a reordered joint list. The video processing method further includes performing
(Continued)

the inter-prediction on the video block based on the reordered joint list and the reference index.

14 Claims, 17 Drawing Sheets

Related U.S. Application Data

(60) Provisional application No. 63/300,312, filed on Jan. 18, 2022.

(51) Int. Cl.
*H04N 19/159* (2014.01)
*H04N 19/176* (2014.01)
*H04N 19/44* (2014.01)

(56) References Cited

OTHER PUBLICATIONS

Na Zhang et al., 'EE2-3.1/EE2-3.2: Adaptive Reordering of Merge Candidates with Template/Bilateral Matching', Joint Video Experts Team (JVET) of ITU-T SG 16 WP 3 and ISO/IEC JTC 1/SC 29 23rd Meeting, by teleconference, JVET-W0090-v2, Jul. 7, 2021 [retrieved on Apr. 17, 2023]. Retrieved from: < URL: https://www.jvet-experts.org/doc_end_user/current_document.php?id=10906>.

BILATERAL MATCHING BASED REFERENCE PICTURE REORDERING

CROSS-REFERENCE TO RELATED APPLICATIONS

This application is a continuation of PCT Application No. PCT/US2023/010452, filed Jan. 10, 2023, which is based upon and claims priority to Provisional Application No. 63/300,312 filed on Jan. 18, 2022. The entire contents of each of the above-referenced applications are expressly incorporated herein by reference.

TECHNICAL FIELD

This application is related to video coding and compression. More specifically, this application relates to video processing apparatuses and methods for inter-prediction.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video processing method for inter-prediction performed by a video encoder. The video processing method may include generating, by a processor of the video encoder, a joint list including a plurality pairs of reference pictures based on a first reference list and a second reference list for a video block in a video frame of a video. The video processing method may include reordering, by the processor of the video encoder, the plurality pairs of reference pictures in the joint list based on bilateral matching using one or more motion vectors of the video block to generate a reordered joint list. The video processing method may include performing, by the processor of the video encoder, the inter-prediction on the video block based on the reordered joint list.

Implementations of the present disclosure also provide a video encoder apparatus for inter-prediction. The video encoder apparatus may include a memory configured to store a bitstream and a processor coupled to the memory. The processor may be configured to generate a joint list including a plurality pairs of reference pictures based on a first reference list and a second reference list for a video block in a video frame of a video. The processor may be configured to reorder the plurality pairs of reference pictures in the joint list based on bilateral matching using one or more motion vectors of the video block to generate a reordered joint list. The processor may be configured to perform the inter-prediction on the video block based on the reordered joint list to determine a reference index for the video block. The processor may be configured to generate the bitstream to include the reference index.

Implementations of the present disclosure also provide a non-transitory computer-readable storage medium having stored therein a bitstream and instructions which, when executed by a processor of a video encoder, cause the processor to perform a video processing method for inter-prediction on the video encoder. The video processing method may include generating a joint list including a plurality pairs of reference pictures based on a first reference list and a second reference list for a video block in a video frame of a video. The video processing method may include reordering the plurality pairs of reference pictures in the joint list based on bilateral matching using one or more motion vectors of the video block to generate a reordered joint list. The video processing method may include performing the inter-prediction on the video block based on the reordered joint list to determine a reference index for the video block. The video processing method may include generating the bitstream to include the reference index.

Implementations of the present disclosure provide a video processing method for inter-prediction performed by a video decoder. The video processing method may include determining, by a processor of the video decoder, a reference index for a video block in a video frame of a video from a bitstream. The video processing method may include generating, by the processor of the video decoder, a joint list including a plurality pairs of reference pictures based on a first reference list and a second reference list for the video block. The video processing method may include reordering, by the processor of the video decoder, the plurality pairs of reference pictures in the joint list based on bilateral matching using one or more motion vectors of the video block to generate a reordered joint list. The video processing method may include performing, by the processor of the video decoder, the inter-prediction on the video block based on the reordered joint list and the reference index.

Implementations of the present disclosure also provide a video decoder apparatus for inter-prediction. The video decoder apparatus may include a memory configured to store a bitstream and a processor coupled to the memory. The processor may be configured to determine a reference index for a video block in a video frame of a video from the bitstream. The processor may be configured to generate a joint list including a plurality pairs of reference pictures based on a first reference list and a second reference list for the video block. The processor may be configured to reorder the plurality pairs of reference pictures in the joint list based on bilateral matching using one or more motion vectors of the video block to generate a reordered joint list. The processor may be configured to perform the inter-prediction on the video block based on the reordered joint list and the reference index.

Implementations of the present disclosure also provide a non-transitory computer-readable storage medium having stored therein a bitstream and instructions which, when executed by a processor of a video decoder, cause the processor to perform a video processing method for inter-prediction. The video processing method may include determining a reference index for a video block in a video frame of a video from the bitstream. The video processing method may include generating a joint list including a plurality pairs of reference pictures based on a first reference list and a second reference list for the video block. The video processing method may include reordering the plurality pairs of reference pictures in the joint list based on bilateral matching using one or more motion vectors of the video block to generate a reordered joint list. The video processing method may include performing the inter-prediction on the video block based on the reordered joint list and the reference index.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
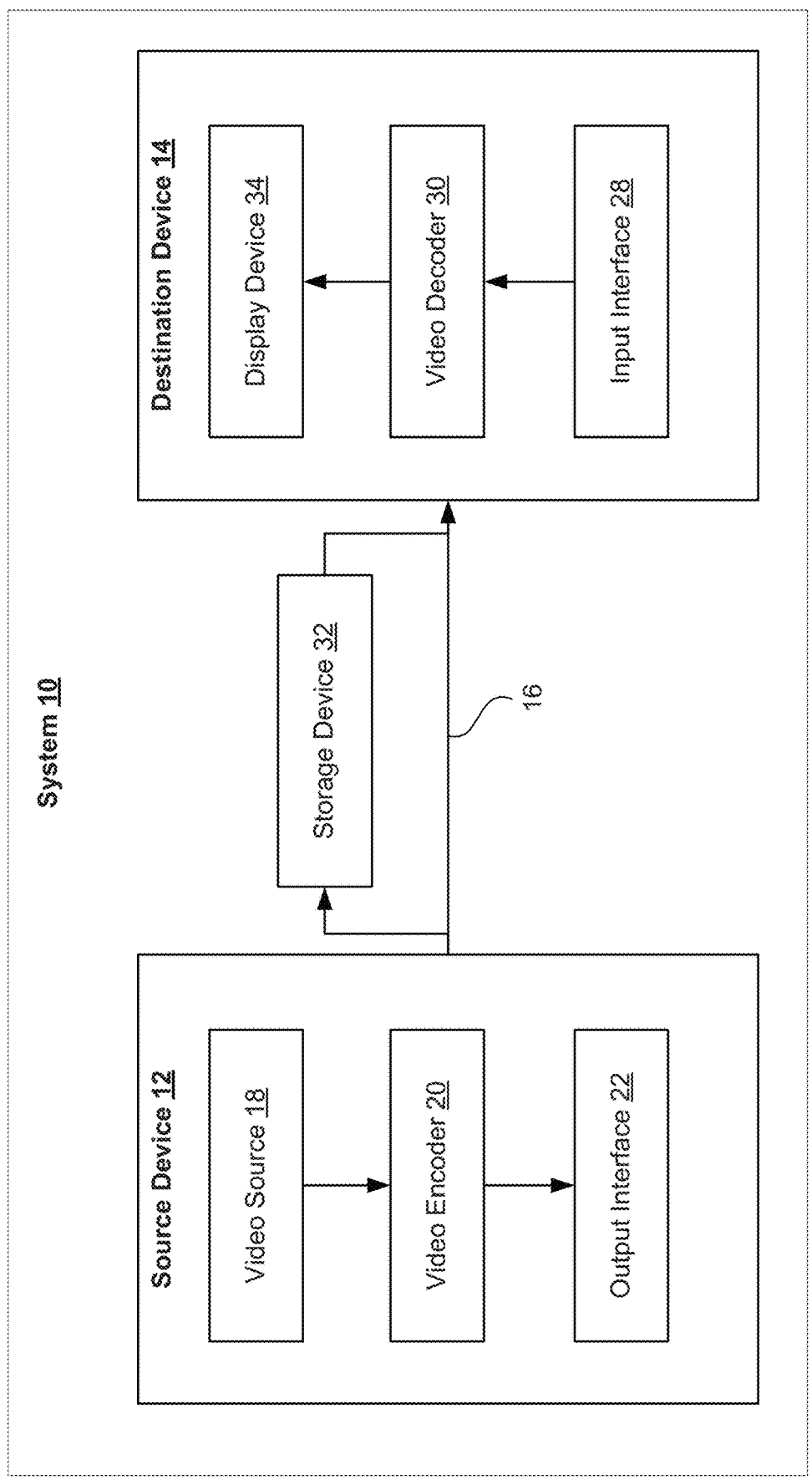
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
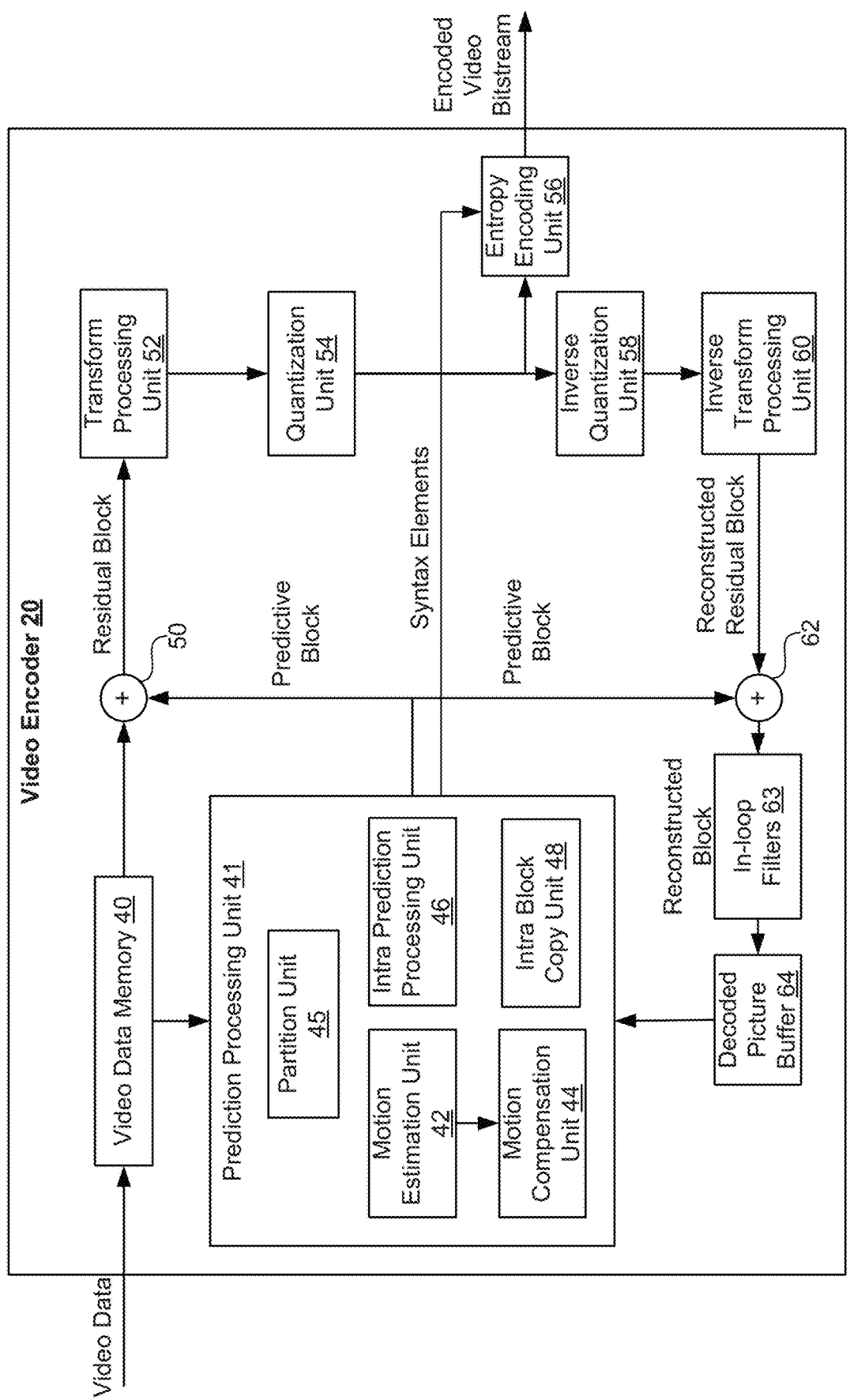
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter, Cross Component Sample Adaptive Offset (CCSAO) filter and/or Adaptive in-Loop Filter (ALF), may also be used in addition to the deblocking filter to filter an output of the summer 62. It should be illustrated that for the CCSAO technique, the present application is not limited to the embodiments described herein, and instead, the application may be applied to a situation where an offset is selected for any of a luma component, a Cb chroma component and a Cr chroma component according to any other of the luma component, the Cb chroma component and the Cr chroma component to modify said any component based on the selected offset. Further, it should also be illustrated that a first component mentioned herein may be any of the luma component, the Cb chroma component and the Cr chroma component, a second component mentioned herein may be any other of the luma component, the Cb chroma component and the Cr chroma component, and a third component mentioned herein may be a remaining one of the luma component, the Cb chroma component and the Cr chroma component. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g. a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
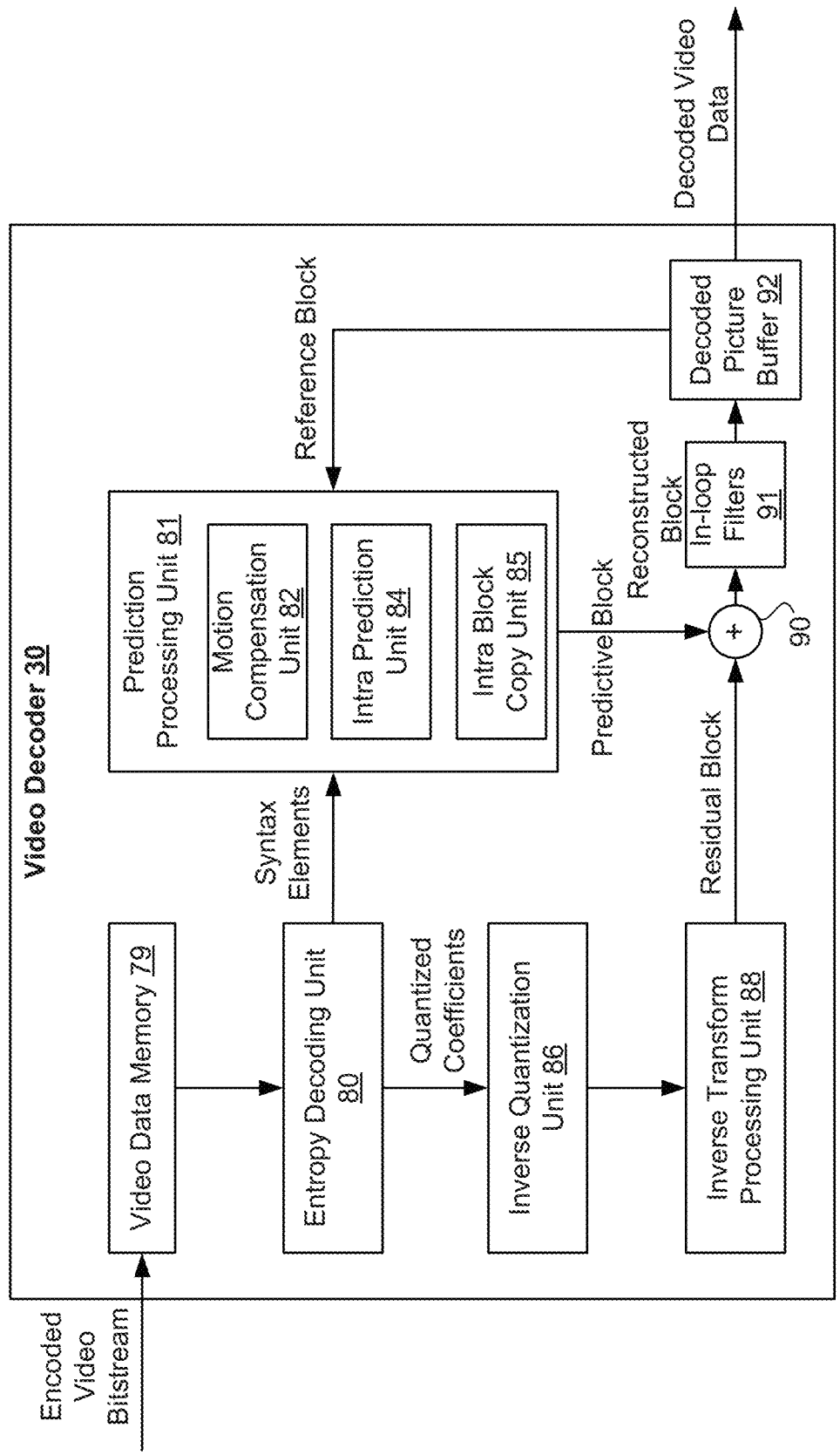
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter, CCSAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
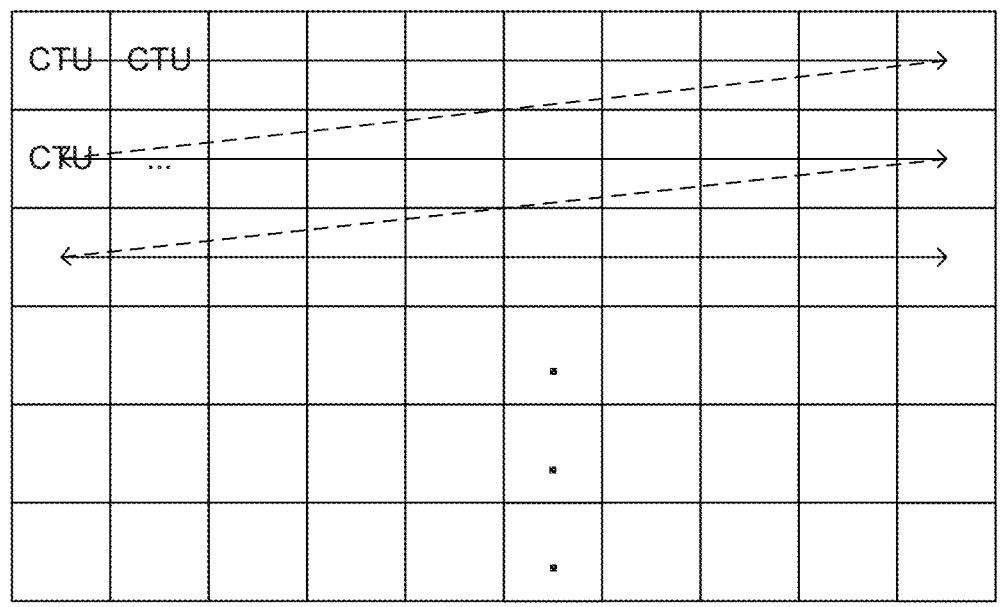
FIGS. 4A through 4E are block diagrams illustrating how a frame is recursively partitioned into multiple video blocks of different sizes and shapes in accordance with some implementations of the present disclosure.
Figure 4B:
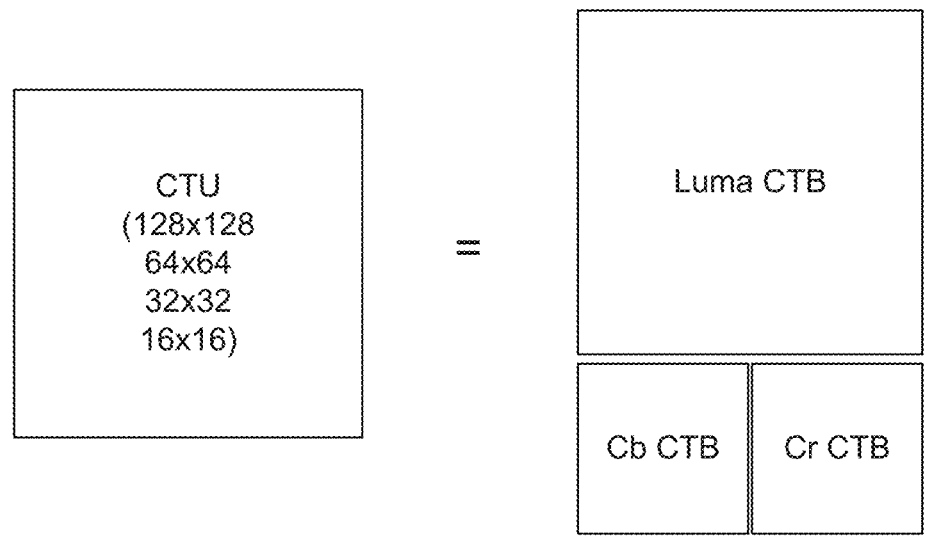

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
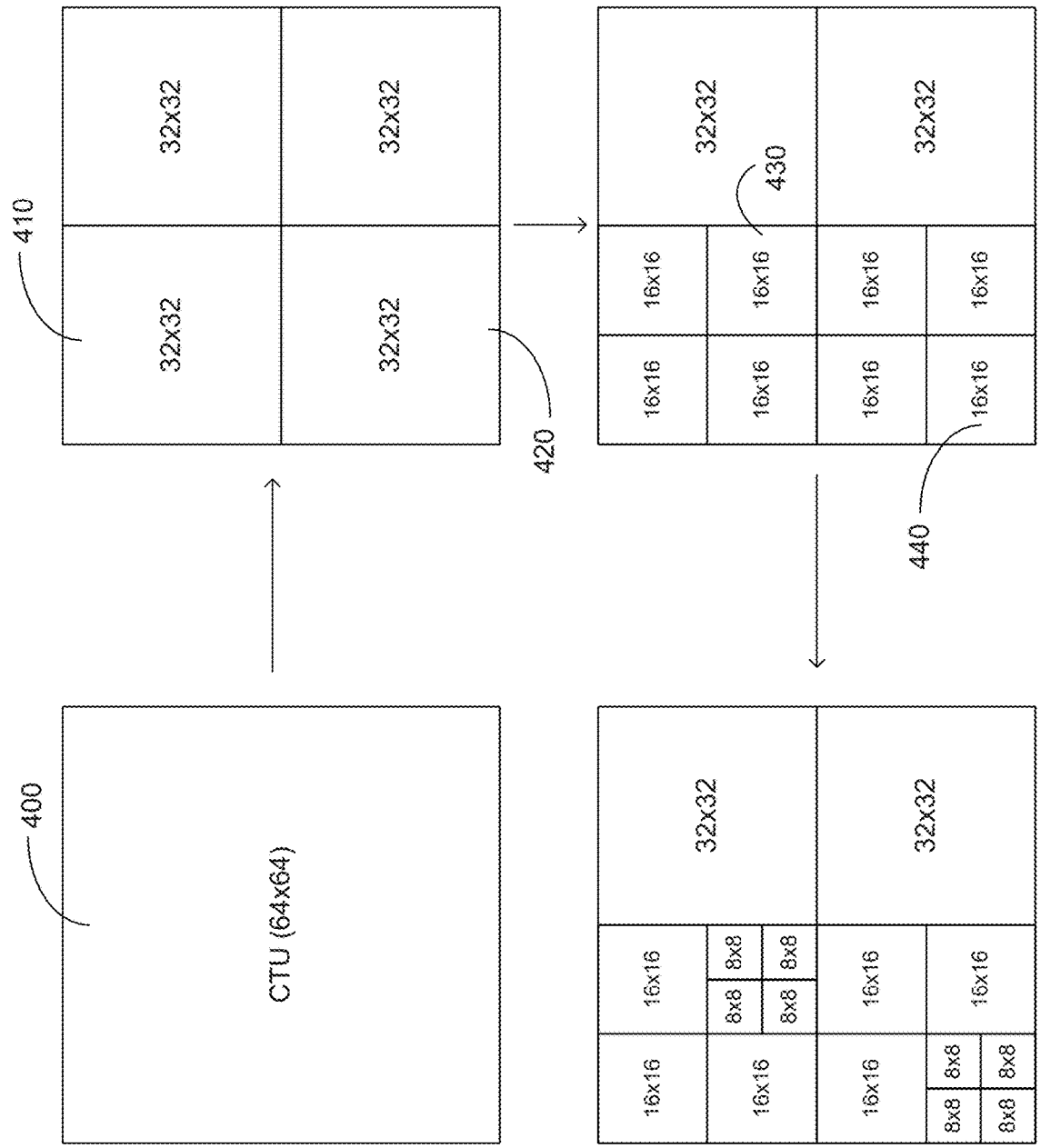
Figure 4D:
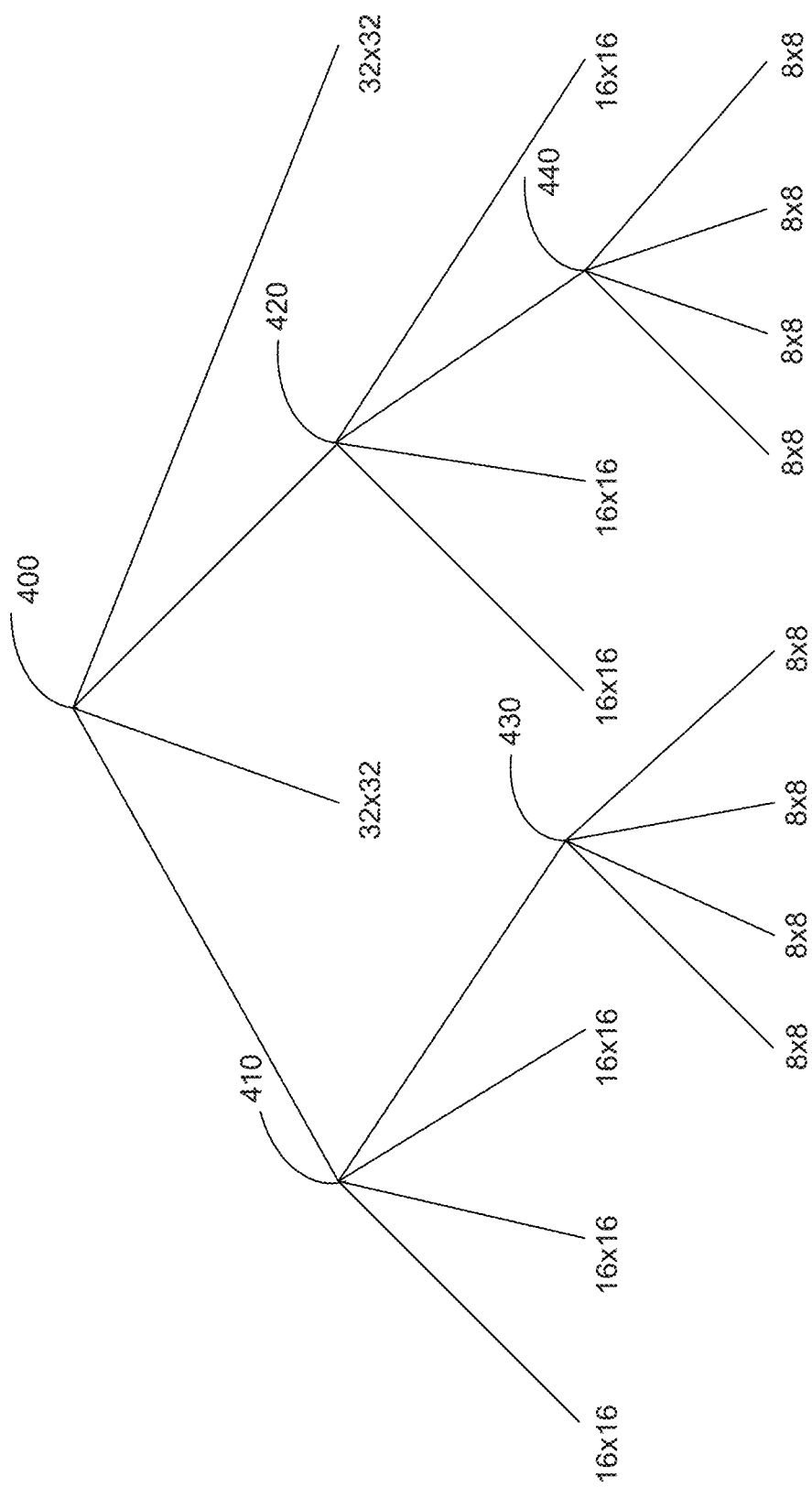
Figure 4E:
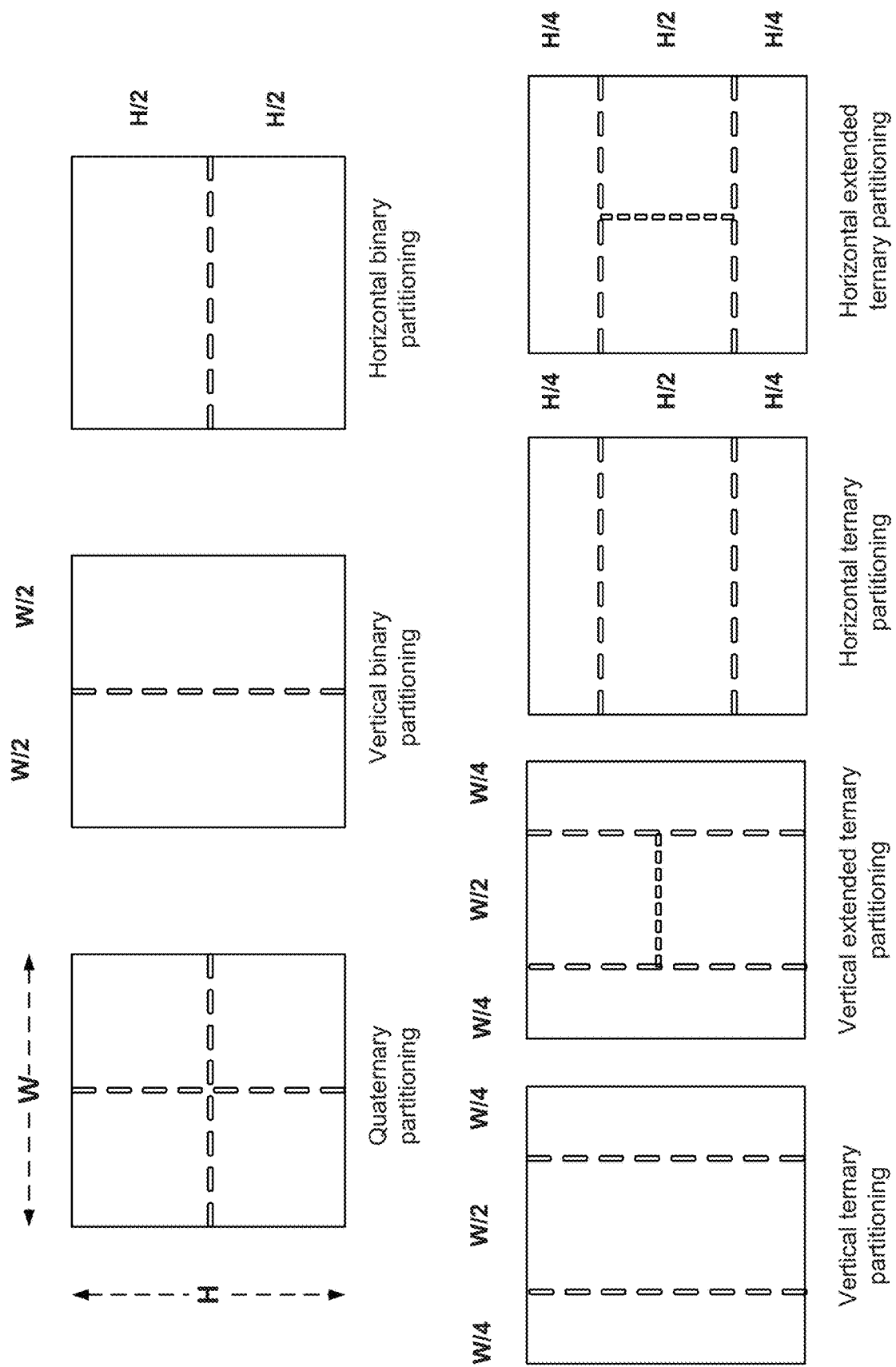

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, horizontal binary partitioning, vertical binary partitioning, horizontal ternary partitioning, horizontal extended ternary partitioning, vertical ternary partitioning and vertical extended ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

In inter-prediction, the selection of reference pictures and the construction of reference lists (e.g., List 0, List 1 described above) may contribute to the improvement of the compression efficiency. In existing methods, the construction of each reference list may be fixed. For example, an order of the reference pictures in each reference list for a particular video block may be fixed (e.g., each reference list may have a fixed reference picture order). However, the correlation between the video block and the reference pictures in the lists may vary for different content. Therefore, it can be difficult to improve the prediction efficiency by using the fixed reference picture order in the reference lists.

Figure 5:
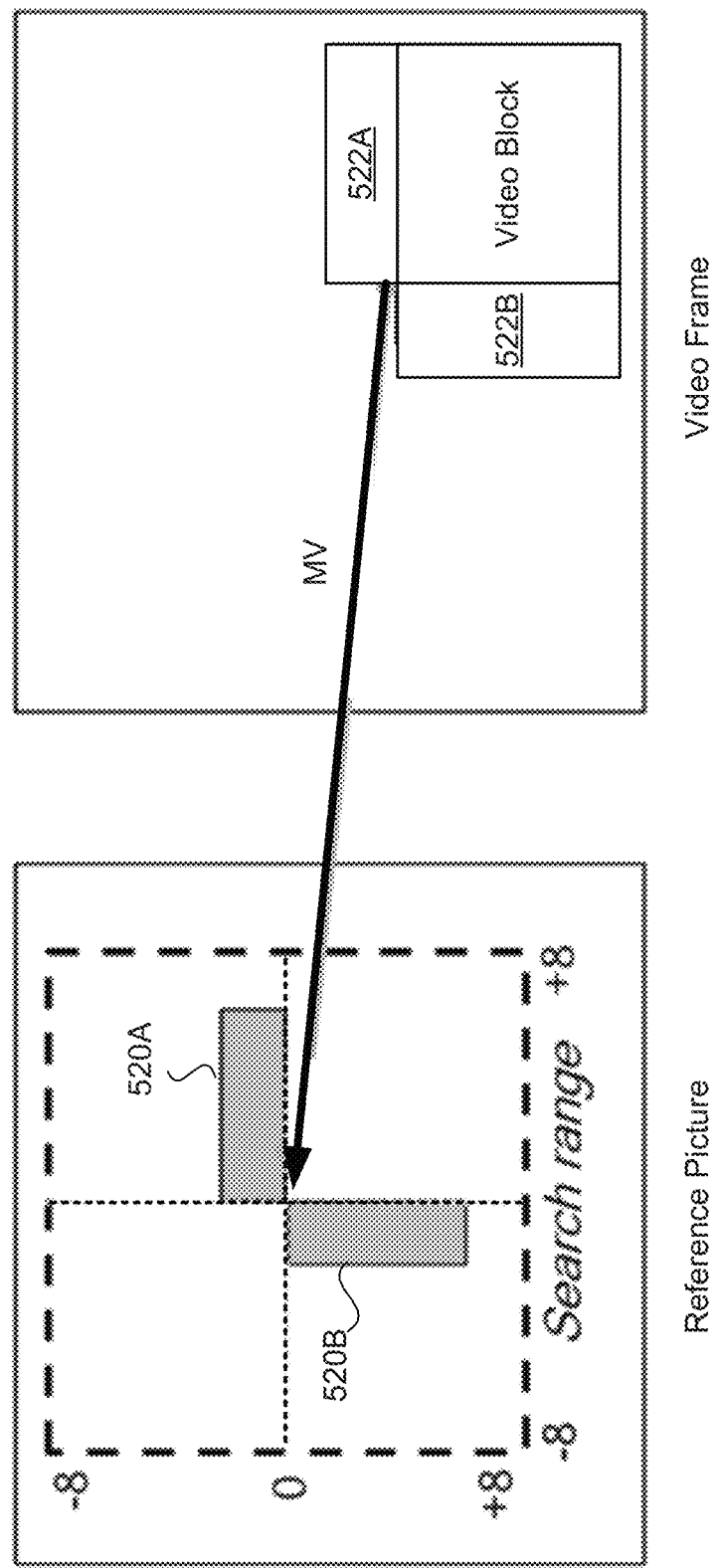
FIG. 5 is an illustration of template matching in accordance with some implementations of the present disclosure.

Consistent with some implementations of the present disclosure, reference pictures in the reference lists can be reordered using template matching. A reference picture reordering method which is based on template matching can be used to improve the coding efficiency of the inter-prediction under random access configuration. A template matching cost can be calculated for each reference picture. Specifically, with reference to FIG. 5, a template for a video block from a video frame can be determined to include at least one of (a) reconstructed samples located on a top region 522A above the video block or (b) reconstructed samples located on a left region 522B of the video block. A motion vector (MV) for the video block can be determined by motion estimation unit 42 as described above in connection with FIG. 2. Then, given the motion vector MV and the template for the video block, a reference region corresponding to the reference picture can be determined. For example, the reference region can be determined from the reference picture based on the template and the motion vector MV of the video block, so that the reference region may have the same size as the template and may include one or more reference blocks 520A and 520B from the reference picture, where the one or more reference blocks 520A and 520B are determined based on the motion vector MV of the video block. Subsequently, a template matching cost can be calculated between the reference region and the template. For example, the template matching cost can use a difference metric such as an MSE, an SAD, an SSD, etc., between the reference region and the template.

In a first example of the template-matching based reference picture reordering method (e.g., in a uni-prediction advanced motion vector prediction (AMVP) mode), reference pictures in List 0 and List 1 can be used to generate a joint list. For each hypothesis of the reference picture in the joint list, motion information can be derived accordingly, and the template matching can be performed to calculate a template matching cost for the hypothesis of the reference picture. Then, the hypotheses of the reference pictures in the joint list can be reordered based on an ascending order of their respective template matching costs to generate a reordered joint list. A reference picture in the reordered joint list can be selected for a video block, and an index of the selected reference picture in the reordered joint list can be signaled in a bitstream from a video encoder to a video decoder.

In a second example of the template-matching based reference picture reordering method (e.g., in the bi-prediction AMVP mode), a list of pairs of reference pictures can be generated from List 0 and List 1 and reordered based on their respective template matching costs to generate a reordered list. A pair of reference pictures in the reordered list can be selected for the video block, and an index of the selected pair of reference pictures in the reordered list can be signaled in the bitstream from the video encoder to the video decoder.

Although the template-matching based reference picture reordering method can improve the prediction accuracy, the implementation of template matching can be a disadvantage for the hardware implementation due to the pipeline latency. Consistent with some implementations of the present disclosure, coding efficiency of inter-prediction can be improved by adaptive reference picture reordering based on bilateral matching. The application of bilateral matching can reduce the pipeline latency of the hardware implementation when compared with the application of template matching.

The bilateral-matching based reference picture reordering technique disclosed herein may be conducted at a block level (e.g., for each video block), so that a corresponding reference picture order can be derived for each video block with its motion vectors to generate a reordered joint list. The reordered joint list can be applied for the inter-prediction of the video block. The bilateral-matching based reference picture reordering technique is described below in more detail with reference to FIGS. 6A-13.

Figures 6A, 6B:
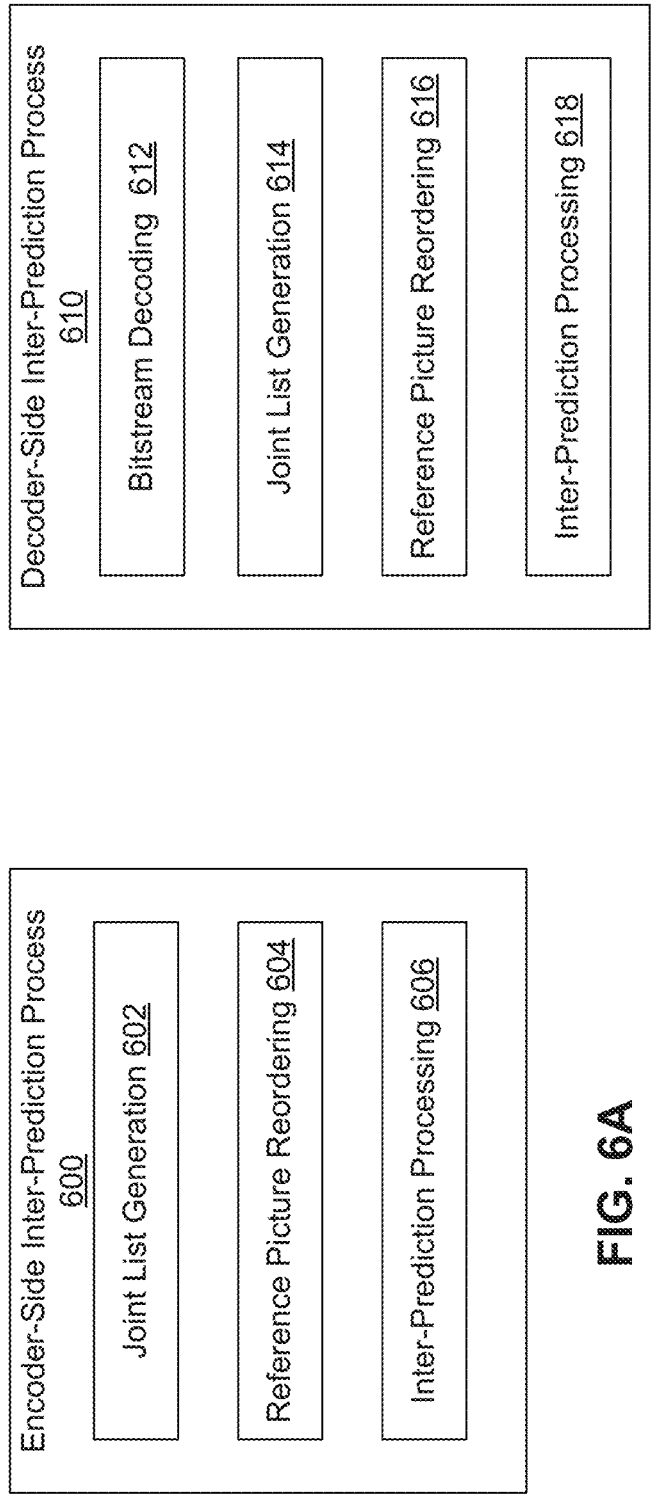
FIG. 6A is a block diagram illustrating an exemplary encoder-side inter-prediction process in accordance with some implementations of the present disclosure.
FIG. 6B is a block diagram illustrating an exemplary decoder-side inter-prediction process in accordance with some implementations of the present disclosure.
Figure 14:
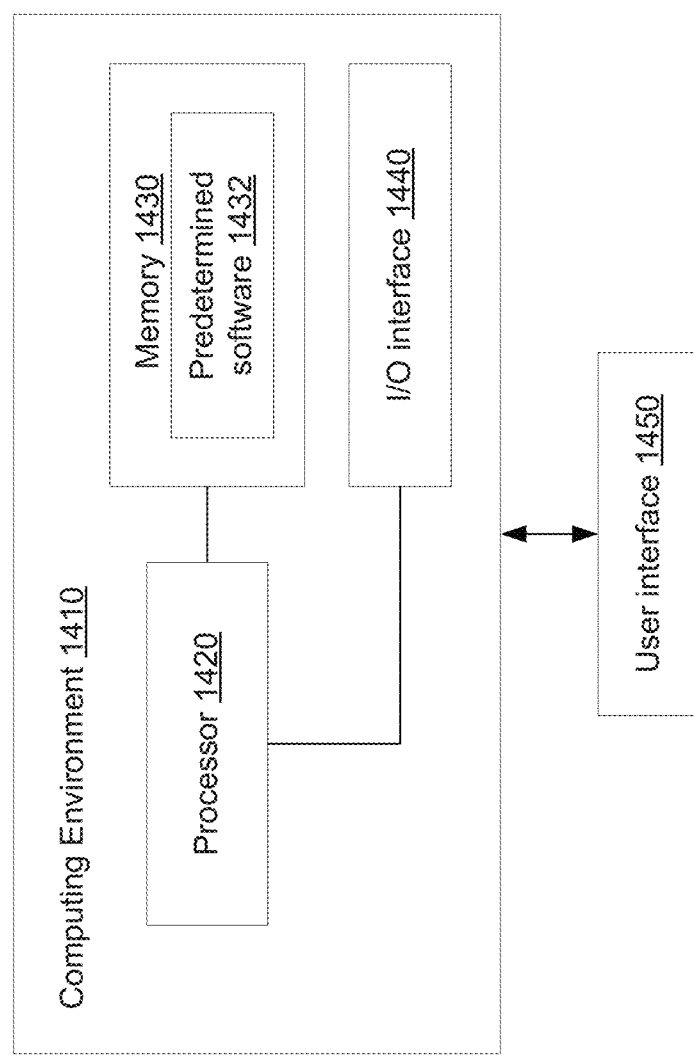
FIG. 14 is a diagram illustrating a computing environment coupled with a user interface, according to some implementations of the present disclosure.

FIG. 6A is a block diagram illustrating an exemplary encoder-side inter-prediction process 600 in accordance with some implementations of the present disclosure. In some implementations, encoder-side inter-prediction process 600 can be performed by prediction processing unit 41 of video encoder 20. In some implementations, encoder-side inter-prediction process 600 may be performed by a processor (e.g., a processor 1420 as shown in FIG. 14) on the encoder side. For illustration purposes only, encoder-side inter-prediction process 600 of FIG. 6A is described below as being implemented using the processor on the encoder side. FIG. 6A is described together with FIGS. 7-11. Encoder-side inter-prediction process 600 may be performed at a block level, e.g., for each video block from a video frame of a video. In some implementations, encoder-side inter-prediction process 600 may include a joint list generation 602, a reference picture reordering 604, and an inter-prediction processing 606.

To start with joint list generation 602 for a video block from the video frame of the video, the processor on the encoder side may generate a joint list including a plurality pairs of reference pictures based on a first reference list and a second reference list. The first and second reference lists can be, for example, List 0 and List 1 for the video block, respectively. Each of the first and second reference lists may have a plurality of reference pictures, respectively.

In some implementations, a random access configuration can be applied in the first and second reference lists. Specifically, reference pictures in the first reference list may have picture order counts (POCs) smaller than that of the video frame, and reference pictures in the second reference list may have POCs greater than that of the video frame. In this case, the reference pictures in the first reference list may be before the video frame in the display order, and the reference pictures in the second reference list may be after the video frame in the display order. For example, with reference to FIG. 7, a video frame may be displayed on a sample time i, where i can be any positive integer greater than 2. A first reference list (e.g., List 0) may include reference pictures ref00 and ref01 displayed on sample times i−1 and i−2, respectively (e.g., List 0={ref00, ref01}). A second reference list (e.g., List 1) may include reference pictures ref10 and ref11 displayed on sample times i+1 and i+2, respectively (e.g., List 1={ref10, ref11}). The reference pictures ref00 and ref01 in List 0 are displayed before the video frame, whereas the reference pictures ref10 and ref11 in List 1 are displayed after the video frame.

Alternatively, a low delay configuration can be applied in the first and second reference lists, with reference pictures in the first and second reference lists having POCs smaller than that of the video frame. In this case, the reference pictures in the first and second reference lists may be before the video frame in the display order. For example, with reference to FIG. 10, a first reference list (e.g., List 0) and a second reference list (e.g., List 1) may include the same reference pictures but with different picture orders. List 0 may include reference pictures ref0, ref1, ref2, and ref3 with the picture order from a sample time i−1 to a sample time i−4, respectively (e.g., List 0={ref0, ref1, ref2, ref3}). List 1 may include reference pictures ref3, ref2, ref1, and ref0 with the picture order from the sample time i−4 to the sample time i−1, respectively (e.g., List 1={ref3, ref2, ref1, ref0}). The reference pictures in List 0 and List 1 are displayed before the video frame.

In some implementations, a bi-prediction scheme is applied in the coding of the video block. Accordingly, a pair of motion vectors (e.g., a first motion vector MV1 and a second motion vector MV2) for the first and second reference lists may be determined respectively for the video block by motion estimation unit 42 as described above. The processor on the encoder side may generate a plurality pairs of reference pictures in the joint list, with each pair of reference pictures including a first reference picture from the first reference list and a second reference picture from the second reference list. For example, with respect to List 0={ref00, ref01} and List 1={ref10, ref11} illustrated in FIG. 7 under the random access configuration, the joint list can include 4 pairs of reference pictures from List 0 and List 1 (e.g., Joint List={(ref00, ref10), (ref00, ref11), (ref01, ref10), (ref01, ref11)}.

Figure 10:
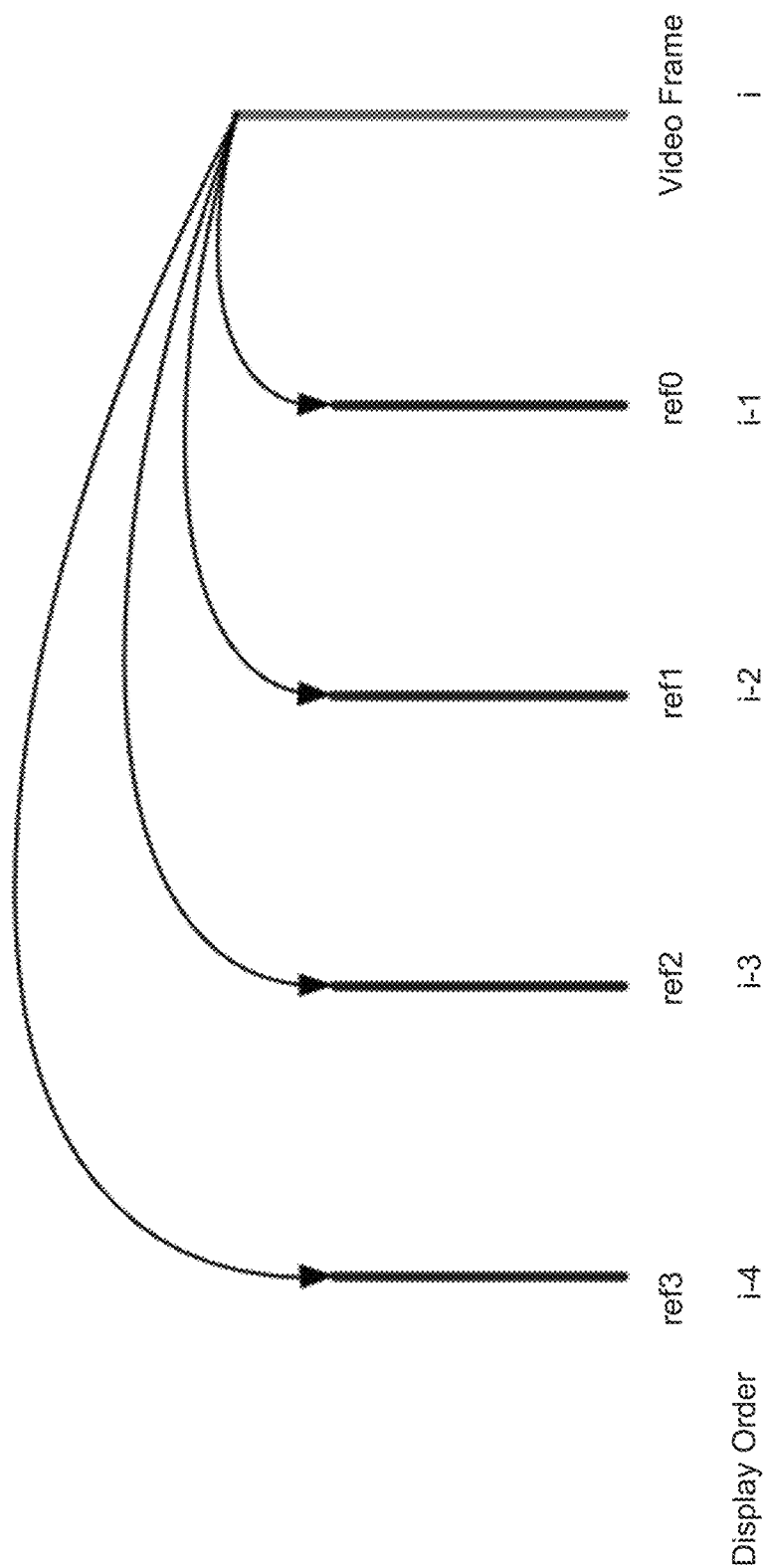
FIG. 10 is an illustration of an exemplary reference structure for low delay configuration in accordance with some implementations of the present disclosure.

In another example, with respect to List 0={ref0, ref1, ref2, ref3} and List 1={ref3, ref2, ref1, ref0} illustrated in FIG. 10 under the low delay configuration, the joint list can include 16 pairs of reference pictures from List 0 and List 1 (e.g., Joint List={(ref0, ref0), (ref0, ref1), (ref0, ref2), (ref0, ref3), (ref1, ref0), (ref1, ref1), (ref1, ref2), (ref1, ref3), (ref2, ref0), (ref2, ref1), (ref2, ref2), (ref2, ref3), (ref3, ref0), (ref3, ref1), (ref3, ref2), (ref3, ref3)}. If the first motion vector MV1 for List 0 is equal to the second motion vector MV2 for List 1, the pairs of reference pictures which have the same reference pictures (e.g., (ref0, ref0), (ref1, ref1), (ref2, ref2), (ref3, ref3)) can be removed from the joint list. Then, the joint list can be modified to include 12 pairs of reference pictures from List 0 and List 1 (e.g., Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)}.

In some implementations, a uni-prediction scheme is applied in the coding of the video block. A first motion vector MV may be determined for the video block by motion estimation unit 42 described above. In a first exemplary scenario when the random access configuration is applied in the first and second reference lists under the uni-prediction scheme, the processor on the encoder side may determine an inter-prediction direction for the uni-prediction scheme. Alternatively, the inter-prediction direction can be determined by motion estimation unit 42 described above. Next, the processor may determine a direction-consistent list to be one of the first and second reference lists based on the inter-prediction direction, and determine a counter-direction list to be another one of the first and second reference lists. The direction-consistent list can be a reference list which has the same direction as the inter-prediction direction, whereas the counter-direction list can be another reference list which has an opposite direction to the inter-prediction direction. The direction-consistent list can be denoted as List X, and the counter-direction list can be denoted as List (1−X), with X=0 or 1. The processor may generate a plurality pairs of reference pictures in the joint list, with each pair of reference pictures including a first reference picture from the direction-consistent list and a second reference picture from the counter-direction list.

Figure 7:
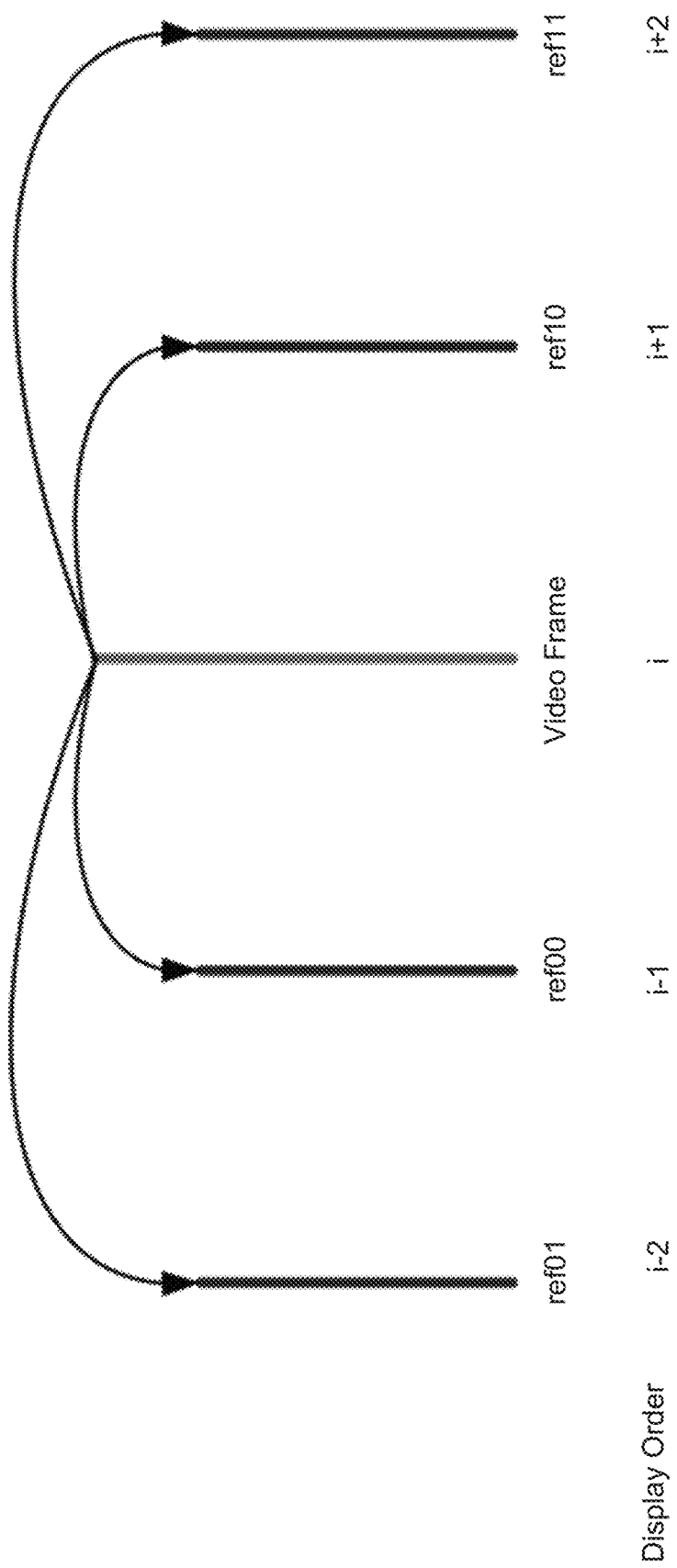
FIG. 7 is an illustration of an exemplary reference structure for random access configuration in accordance with some implementations of the present disclosure.
Figure 8:
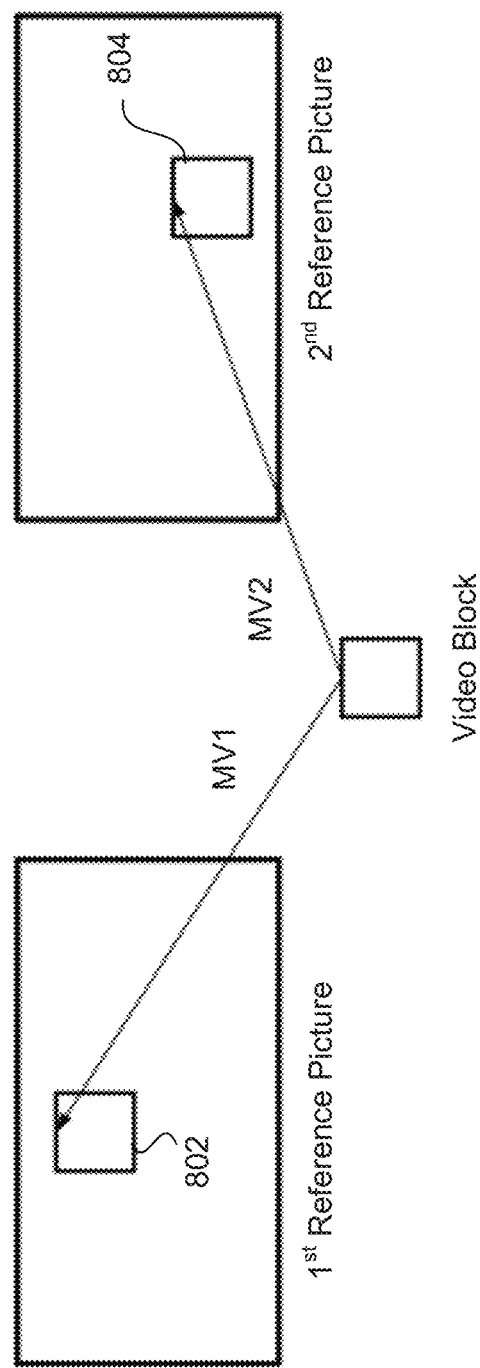
FIG. 8 is an illustration of an exemplary bilateral matching process in accordance with some implementations of the present disclosure.

For example, with respect to List 0={ref00, ref01} and List 1={ref10, ref11}) illustrated in FIG. 7 under the random access configuration, the joint list can include 4 pairs of reference pictures with Joint List={(refX0, ref(1−X)0), (refX0, ref(1−X)1), (refX1, ref(1−X)0), (refX1, ref(1−X)1)}. If the inter-prediction direction is the same as List 0, then the direction-consistent list can be List 0, and the counter-direction list can be List 1. As a result, the joint list can be Joint List={(ref00, ref10), (ref00, ref11), (ref01, ref10), (ref01, ref11)}. Alternatively, if the inter-prediction direction is the same as List 1, then the direction-consistent list can be List 1, and the counter-direction list can be List 0. As a result, the joint list can be Joint List={(ref10, ref00), (ref10, ref01), (ref11, ref00), (ref11, ref01)}.

In a second exemplary scenario when the low delay configuration is applied in the first and second reference lists under the uni-prediction scheme, the processor may not need to determine the inter-prediction direction since either the first reference list or the second reference list already includes all the reference pictures. That is, the inter-prediction direction does not need to be signaled from the video encoder to the video decoder. The processor may generate a plurality pairs of reference pictures in the joint list, with each pair of reference pictures including a first reference picture from the first reference list and a second reference picture from the second reference list.

For example, with respect to List 0={ref0, ref1, ref2, ref3} and List 1={ref3, ref2, ref1, ref0}) illustrated in FIG. 10 under the low delay configuration, the joint list can include 12 pairs of reference pictures from List 0 and List 1 (e.g., Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)}. The corresponding pairs of reference pictures which have the same reference pictures (e.g., (ref0, ref0), (ref1, ref1), (ref2, ref2), (ref3, ref3)) are not included in the joint list. The first motion vector MV of the video block may point to the first reference picture in each pair of reference pictures in the joint list.

Next, encoder-side inter-prediction process 600 may proceed to reference picture reordering 604 in which the plurality pairs of reference pictures in the joint list can be reordered based on bilateral matching using one or more motion vectors of the video block to generate a reordered joint list. Specifically, the processor may determine a plurality of bilateral matching costs for the plurality pairs of reference pictures in the joint list, respectively, and reorder the plurality pairs of reference pictures according to their respective bilateral matching costs to generate the reordered joint list.

In some implementations, when the bi-prediction scheme is applied in the inter-prediction for the video block, the processor may determine a bilateral matching cost for each pair of reference pictures in the joint list by performing one or more operations described below, so that a plurality of bilateral matching costs can be determined for the plurality pairs of reference pictures. Specifically, each pair of reference pictures in the joint list may include a first reference picture from the first reference list and a second reference picture from the second reference list. The processor may determine a first reference block for the video block from the first reference picture based on the first motion vector MV1 of the video block, and determine a second reference block for the video block from the second reference picture based on the second motion vector MV2 of the video block. The processor may calculate a bilateral matching cost for the pair of reference pictures based on the first and second reference blocks. For example, with reference to FIG. 8, the processor may determine (a) a first reference block 802 from the first reference picture based on the first motion vector MV1 and (b) a second reference block 804 from the second reference picture based on the second motion vector MV2. The processor may calculate the bilateral matching cost to be a difference metric such as an MSE, an SAD, an SSD, etc., between first reference block 802 and second reference block 804.

In some implementations, when the uni-prediction scheme is applied in the inter-prediction for the video block, the processor may determine a bilateral matching cost for each pair of reference pictures in the joint list by performing one or more operations described below, so that a plurality of bilateral matching costs can be determined for the plurality pairs of reference pictures. Specifically, the processor may determine a first reference block for the video block from the first reference picture based on the first motion vector MV of the video block. The processor may scale the first motion vector MV of the video block to generate a second motion vector MV', and determine a second reference block for the video block from the second reference picture based on the second motion vector MV'. The processor may calculate the bilateral matching cost for the pair of reference pictures based on the first and second reference blocks.

Figure 9:
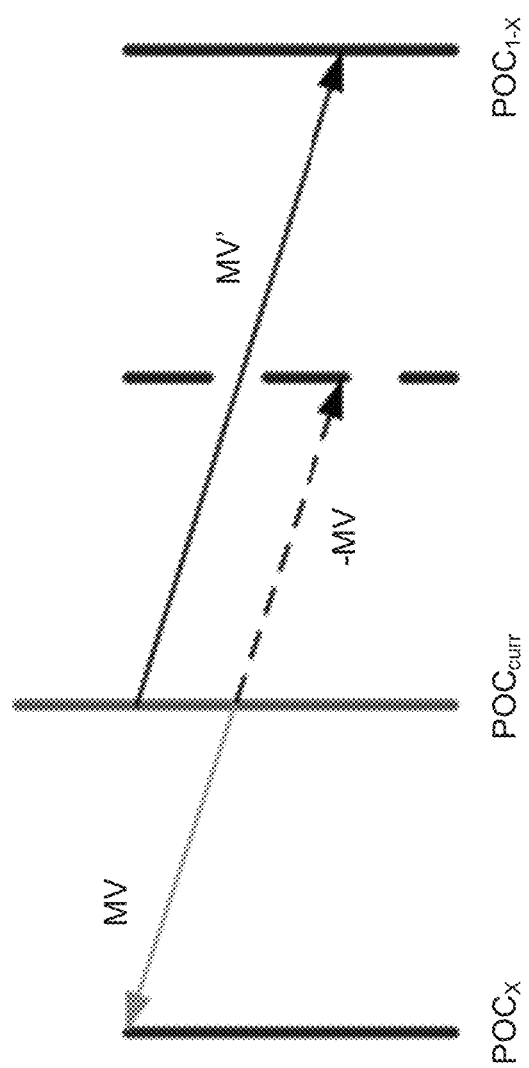
FIG. 9 is an illustration of an exemplary motion vector scaling for random access configuration in accordance with some implementations of the present disclosure.

For example, in a first exemplary scenario when the random access configuration is applied under the uni-prediction scheme, each pair of reference pictures in the joint list may include a first reference picture from the direction-consistent list (List X) and a second reference picture from the counter-direction list (List (1−X)). An exemplary motion vector scaling process is illustrated in FIG. 9. With reference to FIG. 9, the second motion vector MV' for the second reference picture in List (1−X) can be calculated as follows:

$$MV' = -\frac{\text{abs}(POC_{cur} - POC_{(1-X)})}{\text{abs}(POC_{cur} - POC_X)} \times MV. \quad (1)$$

In the above equation (1), abs(.) denotes an absolute function. POCcur denotes a POC value for the video frame. $POC_X$, and $POC_{(1-X)}$ denote POC values for the first reference picture and the second reference picture in the pair, respectively. MV and MV' denote motion vectors for the first reference picture and the second reference picture in the pair, respectively.

Figure 11:
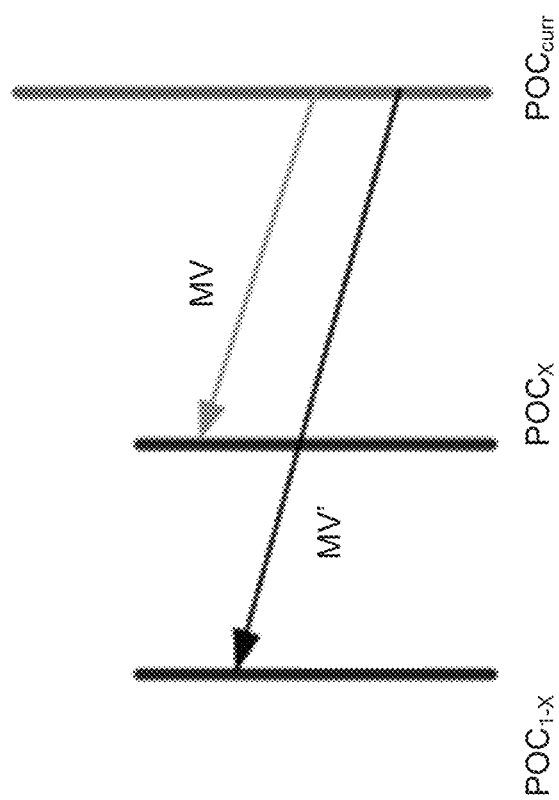
FIG. 11 is an illustration of an exemplary motion vector scaling for low delay configuration in accordance with some implementations of the present disclosure.

In a second exemplary scenario when the low delay configuration is applied under the uni-prediction scheme, each pair of reference pictures in the joint list may include a first reference picture from the first reference list and a second reference picture from the second reference list. An exemplary motion vector scaling process is illustrated in FIG. 11. The second motion vector MV' for the second reference picture can be calculated as follows:

$$MV' = -\frac{\text{abs}(POC_{cur} - POC_{(1-X)})}{\text{abs}(POC_{cur} - POC_X)} \times MV. \quad (2)$$

In the above equation (2), abs(.) denotes an absolute function. POCcur denotes a POC value for the video frame. $POC_X$, and $POC_{(1-X)}$ denote POC values for the first reference picture and the second reference picture in the pair, respectively. MV and MV' denote motion vectors for the first reference picture and the second reference picture in the pair, respectively.

In either the first exemplary scenario or the second exemplary scenario, the processor may determine a first reference block for the video block from the first reference picture based on the first motion vector MV, and determine a second reference block for the video block from the second reference picture based on the second motion vector MV'. The processor may calculate the bilateral matching cost for the pair of reference pictures to be a difference metric such as an MSE, an SAD, an SSD, etc., between the first reference block and the second reference block.

In some implementations, the processor may reorder the plurality pairs of reference pictures in the joint list according to an ascending order of their respective bilateral matching costs, so that a reordered joint list can be generated for the video block. It is contemplated that the plurality pairs of reference pictures in the joint list can be reordered according to any other order (such as a descending order) of their respective bilateral matching costs, which is not limited herein.

In some implementations, when the uni-prediction scheme is applied, a reordered reference list can be generated for the video block from the reordered joint list. For example, in the first exemplary scenario when the random access configuration is applied under the uni-prediction scheme, if one of the bilateral matching costs for the pairs of reference pictures (refX0, ref(1−X)0) and (refX0, ref(1−X)1) is smaller than the bilateral matching costs for the pairs of reference pictures (refX1, ref(1−X)0) and (refX1, ref(1−X)1), then the reference picture refX0 is before the reference picture refX1 in the reordered reference list. That is, the reordered reference list={refX0, refX1}. Otherwise, the reference picture refX1 is before the reference picture refX0 in the reordered reference list. That is, the reordered reference list={refX1, refX0}. In another example, in the second exemplary scenario when the low delay configuration is applied under the uni-prediction scheme, the first reference picture within each pair of reference pictures in the reordered joint list can be used as a corresponding reference picture in the reordered reference list.

Subsequently, encoder-side inter-prediction process 600 may proceed to inter-prediction processing 606 such that inter-prediction may be performed for the video block based on the reordered joint list. In some implementations, when the bi-prediction scheme is applied in the video block, the processor may perform one or more of the following operations to implement the inter-prediction for the video block: (a) selecting a pair of reference pictures from the reordered joint list for the bi-prediction scheme; (b) generating a predictive block for the video block based on the selected pair of reference pictures and a pair of motion vectors of the video block; and (c) signaling the pair of motion vectors and the reference index to the video decoder through a bitstream. For example, the predictive block generated based on the selected pair of reference pictures may have a minimum difference (e.g., a minimum MSE, a minimum SAD, a minimum SSD, etc.) from the video block, when compared with other candidate predictive blocks generated based on other pairs of reference pictures in the reordered joint list.

In some implementations, when the uni-prediction scheme is applied in the video block, the processor may perform one or more of the followings operations to implement the inter-prediction for the video block: (a) selecting a pair of reference pictures from the reordered joint list; and (b) generating a predictive block for the video block based on the first reference picture in the selected pair of reference pictures and a motion vector of the video block. Or, the processor may generate a reordered reference list as described above, select a reference picture from the reordered reference list, and generate a predictive block for the video block based on the selected reference picture and the motion vector of the video block. For example, the predictive block generated based on the first reference picture in the selected pair of reference pictures (or the selected reference picture in the reordered reference list) may have a minimum difference from the video block, when compared with other candidate predictive blocks generated based on other pairs of reference pictures in the reordered joint list (or other reference pictures from the reordered reference list). Further, the processor may generate a reference index used to identify the selected pair of reference pictures (or a reference index used to identify the selected reference picture from the reordered reference list). If the random access configuration is applied, the processor may signal the inter-prediction direction of the video block, the first motion vector MV of the video block, and the reference index to the video decoder through a bitstream. Or, if the low delay configuration is applied, the processor may signal the motion vector and the reference index to the video decoder through the bitstream. There is no need to signal the inter-prediction direction to the video decoder when the low delay configuration is applied.

Various examples of encoder-side inter-prediction process 600 are provided herein. For the bi-prediction scheme, the reference pictures are no longer separated into two reference lists (List 0 and List 1) as existing methods, but are interweaved to generate a joint list. Therefore, only one reference index needs to be signaled for the bi-prediction scheme. A first example of encoder-side inter-prediction process 600 is related to the random access configuration when the bi-prediction scheme is applied. The first example is described with reference to FIG. 7, with the first reference list being List 0={ref00, ref01} and the second reference list being List 1={ref10, ref11}. The first example of encoder-side inter-prediction process 600 may include one or more of the following operations:

(1) determining a pair of motion vector (MV1, MV2) for the video block;
(2) interweaving reference pictures from List 0 and List 1 to generate a joint list, i.e., Joint List={(ref00, ref10), (ref00, ref11), (ref01, ref10), (ref01, ref11)};
(3) given the pair of motion vectors (MV1, MV2), determining a plurality of bilateral matching costs for a plurality pairs of reference pictures in the joint list;
(4) reordering the joint list based on the plurality of bilateral matching costs, respectively (e.g., the plurality pairs of reference pictures in the joint list are reordered based on an ascending order of their respective bilateral matching costs to generate a reordered joint list);
(5) selecting a pair of reference pictures from the reordered joint list for the inter-prediction;
(6) generating a reference index used to identify the selected pair of reference pictures; and
(7) signaling the pair of motion vectors (MV1, MV2) and the reference index to the video decoder.

A second example of encoder-side inter-prediction process 600 is related to the random access configuration when the uni-prediction scheme is applied. The second example is also described with reference to FIG. 7, with the first reference list being List 0={ref00, ref01} and the second reference list being List 1={ref10, ref11}. In the uni-prediction scheme, the reference pictures are from List 0 or List 1. In existing methods, the inter-prediction direction is needed to be signaled to indicate whether List 0 or List 1 is used in the uni-prediction, and then a reference index is signaled to indicate which reference picture in List 0 or List 1 is used for the uni-prediction. In the second example of encoder-side inter-prediction process 600 disclosed herein, the inter-prediction direction is also signaled to the video decoder. The direction-consistent list and the counter-direction list can be List X and List (1−X), respectively, with X=0 or 1. The second example of encoder-side inter-prediction process 600 may include one or more of the following operations:

(1) determining an inter-prediction direction and a first motion vector MV for List X;
(2) interweaving reference pictures from List X and List (1−X) to generate a joint list, i.e., Joint List={(refX0, ref(1−X)0), (refX0, ref(1−X)1), (refX1, ref(1−X)0), (refX1, ref(1−X)1)};
(3) scaling the first motion vector MV to generate a second motion vector MV' for List (1−X);
(4) given the motion vectors MV and MV', determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) generating a reordered reference list based on the reordered joint list (e.g., if one of the bilateral matching costs for the pairs of reference pictures (refX0, ref(1−X)0) and (refX0, ref(1−X)1) is smaller than the bilateral matching costs for the pairs of reference pictures (refX1, ref(1−X)0) and (refX1, ref(1−X)1), then the reference picture refX0 is before the reference picture refX1 in the reordered reference list (e.g., the reordered reference list={refX0, refX1}); otherwise, the reference picture refX1 is before the reference picture refX0 in the reordered reference list (e.g., the reordered reference list={refX1, refX0});
(7) selecting a reference picture from the reordered reference list for the inter-prediction;
(8) generating a reference index used to identify the selected reference picture in the reordered reference list; and
(9) signaling the first motion vector MV, the inter-prediction direction, and the reference index to the video decoder.

A third example of encoder-side inter-prediction process 600 is related to the low delay configuration when the bi-prediction scheme is applied. The third example is described with reference to FIG. 10, with the first reference list being List 0={ref0, ref1, ref2, ref3} and the second reference list being List 1={ref3, ref2, ref1, ref0}. The third example of encoder-side inter-prediction process 600 may include one or more of the following operations:

(1) determining a pair of motion vector (MV1, MV2) for the video block;
(2) interweaving reference pictures from List 0 and List 1 to generate a joint list, i.e., Joint List={(ref0, ref0), (ref0, ref1), (ref0, ref2), (ref0, ref3), (ref1, ref0), (ref1, ref1), (ref1, ref2), (ref1, ref3), (ref2, ref0), (ref2, ref1), (ref2, ref2), (ref2, ref3), (ref3, ref0), (ref3, ref1), (ref3, ref2), (ref3, ref3)};
(3) if the first motion vector MV1 for List 0 is equal to the second motion vector MV2 for List 1, removing the pairs of reference pictures which have the same reference pictures (e.g., (ref0, ref0), (ref1, ref1), (ref2, ref2), (ref3, ref3)) from the joint list, so that the joint list is modified to be Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)};

(4) given the pair of motion vectors (MV1, MV2), determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) selecting a pair of reference pictures from the reordered joint list for the inter-prediction;
(7) generating a reference index used to identify the selected pair of reference pictures; and
(8) signaling the pair of motion vectors (MV1, MV2) and the reference index to the video decoder.

A fourth example of encoder-side inter-prediction process 600 is related to the low delay configuration when the uni-prediction scheme is applied. The fourth example is also described with reference to FIG. 10, with the first reference list being List 0={ref0, ref1, ref2, ref3} and the second reference list being List 1={ref3, ref2, ref1, ref0}. As described above, in existing methods the inter-prediction direction is needed to be signaled to indicate whether List 0 or List 1 is used in the uni-prediction, and then a reference index is signaled to indicate which reference picture in List 0 or List 1 is used for the uni-prediction. In the fourth example of encoder-side inter-prediction process 600 disclosed herein, the inter-prediction direction is not signaled to the video decoder. The fourth example of encoder-side inter-prediction process 600 may include one or more of the following operations:

(1) determining a first motion vector MV for the video block;
(2) interweaving reference pictures from List 0 and List 1 to generate a joint list, i.e., Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)}, where the first motion vector MV points to the first reference picture in each pair of reference pictures in the joint list;
(3) scaling the first motion vector MV to generate a second motion vector MV' for pointing to the second reference picture in each pair of reference pictures in the joint list;
(4) given the motion vector MV and MV', determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) generating a reordered reference list based on the reordered joint list (e.g., the first reference picture in each pair of reference pictures in the reordered joint list is included in the reordered reference list correspondingly);
(7) selecting a reference picture from the reordered reference list for the inter-prediction;
(8) generating a reference index used to identify the selected reference picture in the reordered reference list; and
(9) signaling the first motion vector MV and the reference index to the video decoder.

FIG. 6B is a block diagram illustrating an exemplary decoder-side inter-prediction process 610 in accordance with some implementations of the present disclosure. In some implementations, decoder-side inter-prediction process 610 can be performed by prediction processing unit 81 of video decoder 30. In some implementations, decoder-side inter-prediction process 610 may be performed by a processor (e.g., a processor 1420 as shown in FIG. 14) on the decoder side. For illustration purposes only, FIG. 6B is described herein using the processor on the decoder side. Decoder-side inter-prediction process 610 may be performed at a block level, e.g., for each video block from a video frame of a video. In some implementations, decoder-side inter-prediction process 610 may include a bitstream decoding 612, a joint list generation 614, a reference picture reordering 616, and an inter-prediction processing 618.

To start with bitstream decoding 612 for a video block from the video frame of the video, the processor on the decoder side may decode a bitstream received from the video encoder to determine at least a reference index for the video block. For example, if the bi-prediction scheme is applied, the processor may decode a pair of motion vectors (MV1, MV2) and the reference index from the bitstream. In another example, if the uni-prediction scheme is applied with the random access configuration, the processor may decode a first motion vector MV, an inter-prediction direction, and the reference index from the bitstream. In yet another example, if the uni-prediction scheme is applied with the low delay configuration, the processor may decode the first motion vector MV and the reference index from the bitstream.

Operations of joint list generation 614 and reference picture reordering 616 in FIG. 6B may be like those of joint list generation 602 and reference picture reordering 604 in FIG. 6A, respectively, for the generation of a reordered joint list for the video block. Similar descriptions will not be repeated herein.

With respect to inter-prediction processing 618, the processor on the decoder side may perform the inter-prediction on the video block based on the reordered joint list and the reference index. For example, when the bi-prediction scheme is applied, the processor may select a pair of reference pictures from the reordered joint list based on the reference index, where the reference index can identify the selected pair of reference pictures in the reordered joint list. The processor may generate a predictive block for the video block based on the selected pair of reference pictures and the pair of motion vectors (MV1, MV2) of the video block. In another example, when the uni-prediction scheme is applied, the processor may select a pair of reference pictures from the reordered joint list based on the reference index, and generate a predictive block for the video block based on the first reference picture in the selected pair of reference pictures and the first motion vector MV of the video block. In yet another example, when the uni-prediction scheme is applied, the processor may generate a reordered reference list based on the reordered joint list, select a reference picture from the reordered reference list, and generate a predictive block for the video block based on the selected reference picture and the first motion vector MV of the video block.

Various examples of decoder-side inter-prediction process 610 are provided herein. A first example of decoder-side inter-prediction process 610 is related to the random access configuration when the bi-prediction scheme is applied. The first example is described with reference to FIG. 7, with the first reference list being List 0={ref00, ref01} and the second reference list being List 1={ref10, ref11}. The first example of decoder-side inter-prediction process 610 may include one or more of the following operations:

(1) decoding a pair of motion vector (MV1, MV2) and a reference index for the video block from a bitstream received from the video encoder;

(2) interweaving reference pictures from List 0 and List 1 to generate a joint list, i.e., Joint List={(ref00, ref10), (ref00, ref11), (ref01, ref10), (ref01, ref11)};
(3) given the pair of motion vectors (MV1, MV2), determining a plurality of bilateral matching costs for a plurality pairs of reference pictures in the joint list;
(4) reordering the plurality pairs of reference pictures in the joint list based on an ascending order of the bilateral matching costs to generate a reordered joint list;
(5) selecting a pair of reference pictures from the reordered joint list for the inter-prediction using the reference index (e.g., the reference index is used to identify the selected pair of reference pictures in the reordered joint list); and
(6) generating a predictive block for the video block using the selected pair of reference pictures and the pair of motion vectors (MV1, MV2).

A second example of decoder-side inter-prediction process 610 may be implemented when the random access configuration and the uni-prediction scheme are applied. The second example is also described with reference to FIG. 7, with the first reference list being List 0={ref00, ref01} and the second reference list being List 1={ref10, ref11}. In the second example of decoder-side inter-prediction process 610 disclosed herein, an inter-prediction direction is received from the video encoder. A direction-consistent list and a counter-direction list (e.g., List X and List (1−X) with X=0 or 1) can be determined based on the inter-prediction direction, respectively. The second example of decoder-side inter-prediction process 610 may include one or more of the following operations:

(1) decoding an inter-prediction direction, a first motion vector MV for List X, and a reference index for the video block from a bitstream received from the video encoder;
(2) interweaving reference pictures from List X and List (1−X) to generate a joint list, i.e., Joint List={(refX0, ref(1−X)0), (refX0, ref(1−X)1), (refX1, ref(1−X)0), (refX1, ref(1−X)1)};
(3) scaling the first motion vector MV to generate a second motion vector MV' for List (1−X);
(4) given the motion vector MV and MV', determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) generating a reordered reference list based on the reordered joint list by performing operations like those described above with reference to FIG. 6A;
(7) selecting a reference picture from the reordered reference list for the inter-prediction using the reference index; and
(8) generating a predictive block for the video block using the selected reference picture and the first motion vector MV.

A third example of decoder-side inter-prediction process 610 may be implemented when the low delay configuration and the bi-prediction scheme are applied. The third example is described with reference to FIG. 10, with the first reference list being List 0={ref0, ref1, ref2, ref3} and the second reference list being List 1={ref3, ref2, ref1, ref0}. The third example of decoder-side inter-prediction process 610 may include one or more of the following operations:

(1) decoding a pair of motion vector (MV1, MV2) and a reference index for the video block from a bitstream received from the video encoder;
(2) interweaving reference pictures from List 0 and List 1 to generate a joint list, i.e., Joint List={(ref0, ref0), (ref0, ref1), (ref0, ref2), (ref0, ref3), (ref1, ref0), (ref1, ref1), (ref1, ref2), (ref1, ref3), (ref2, ref0), (ref2, ref1), (ref2, ref2), (ref2, ref3), (ref3, ref0), (ref3, ref1), (ref3, ref2), (ref3, ref3)};
(3) if the first motion vector MV1 for List 0 is equal to the second motion vector MV2 for List 1, removing the corresponding pairs of reference pictures which have the same reference pictures (e.g., (ref0, ref0), (ref1, ref1), (ref2, ref2), (ref3, ref3)) from the joint list, so that the joint list is modified to be Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)};
(4) given the pair of motion vectors (MV1, MV2), determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) selecting a pair of reference pictures from the reordered joint list for the inter-prediction using the reference index; and
(7) generating a predictive block for the video block using the selected pair of reference pictures and the pair of motion vectors (MV1, MV2).

A fourth example of decoder-side inter-prediction process 610 is related to the low delay configuration when the uni-prediction scheme is applied. The fourth example is also described with reference to FIG. 10, with the first reference list being List 0={ref0, ref1, ref2, ref3} and the second reference list being List 1={ref3, ref2, ref1, ref0}. In the fourth example of decoder-side inter-prediction process 610 disclosed herein, the inter-prediction direction is not needed in the video decoder. The fourth example of decoder-side inter-prediction process 610 may include one or more of the following operations:

(1) decoding a first motion vector MV, and a reference index for the video block from a bitstream received from the video encoder;
(2) interweaving reference pictures from List 0 and List 1 to generate a joint list, i.e., Joint List={(ref0, ref1), (ref0, ref2), (ref0, ref3), (ref1, ref0), (ref1, ref2), (ref1, ref3), (ref2, ref0), (ref2, ref1), (ref2, ref3), (ref3, ref0), (ref3, ref1), (ref3, ref2)}, where the first motion vector MV points to the first reference picture in each pair of reference pictures in the joint list;
(3) scaling the first motion vector MV to generate a second motion vector MV' for pointing to the second reference picture in each pair of reference pictures in the joint list;
(4) given the motion vector MV and MV', determining a plurality of bilateral matching costs for a plurality pairs of reference pictures in the joint list;
(5) reordering the plurality pairs of reference pictures in the joint list based on an ascending order of their respective bilateral matching costs to generate a reordered joint list;
(6) generating a reordered reference list based on the reordered joint list (e.g., the first reference picture in each pair of reference pictures in the reordered joint list is included in the reordered reference list correspondingly);

(7) selecting a reference picture from the reordered reference list for the inter-prediction using the reference index; and (8) generating a predictive block for the video block using the selected reference picture and the first motion vector MV.

Figure 12:
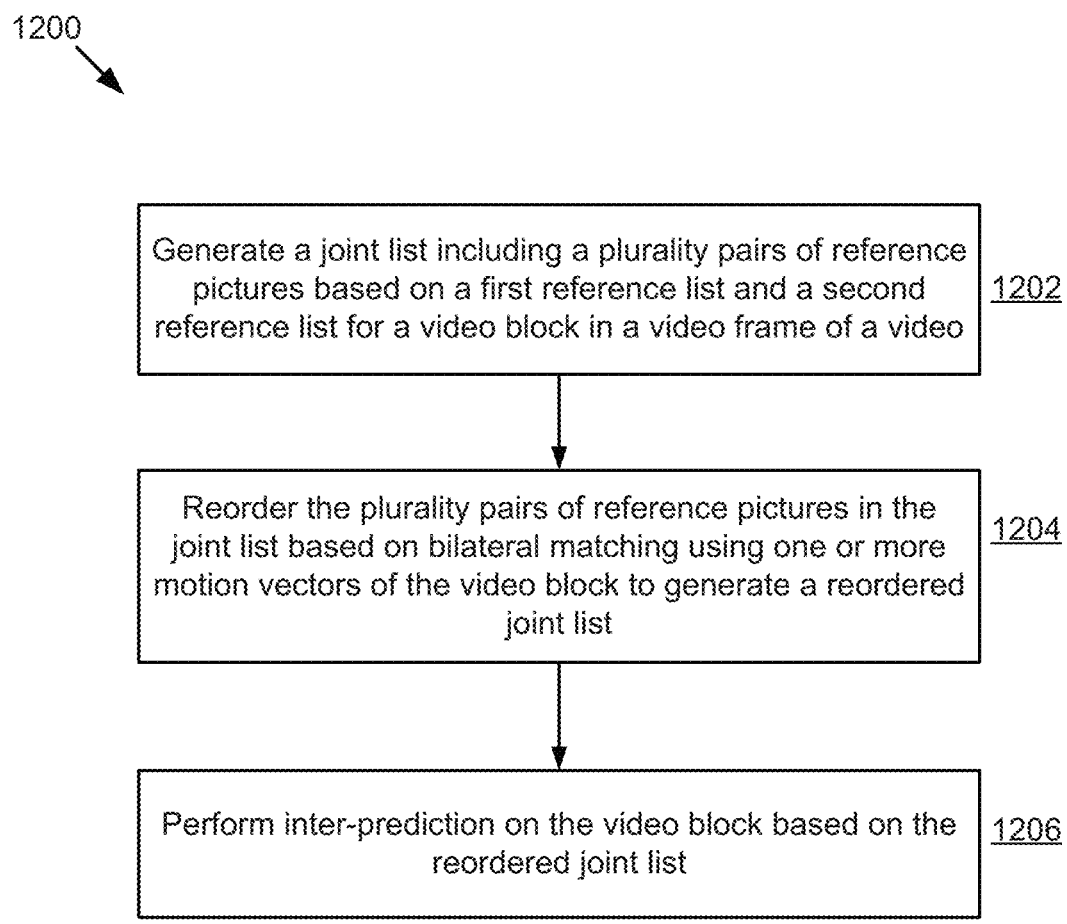
FIG. 12 is a flow chart of an exemplary method for inter-prediction on an encoder side in accordance with some implementations of the present disclosure.

FIG. 12 is a flow chart of an exemplary method 1200 for inter-prediction on an encoder side in accordance with some implementations of the present disclosure. Method 1200 may be implemented by a processor associated with video encoder 20, and may include steps 1202-1206 as described below. Some of the steps may be optional to perform the disclosure provided herein. Further, some of the steps may be performed simultaneously, or in a different order than shown in FIG. 12.

In step 1202, the processor may generate a joint list including a plurality pairs of reference pictures based on a first reference list and a second reference list for a video block in a video frame of a video.

In step 1204, the processor may reorder the plurality pairs of reference pictures in the joint list based on bilateral matching using one or more motion vectors of the video block to generate a reordered joint list.

In step 1206, the processor may perform inter-prediction on the video block based on the reordered joint list.

Figure 13:
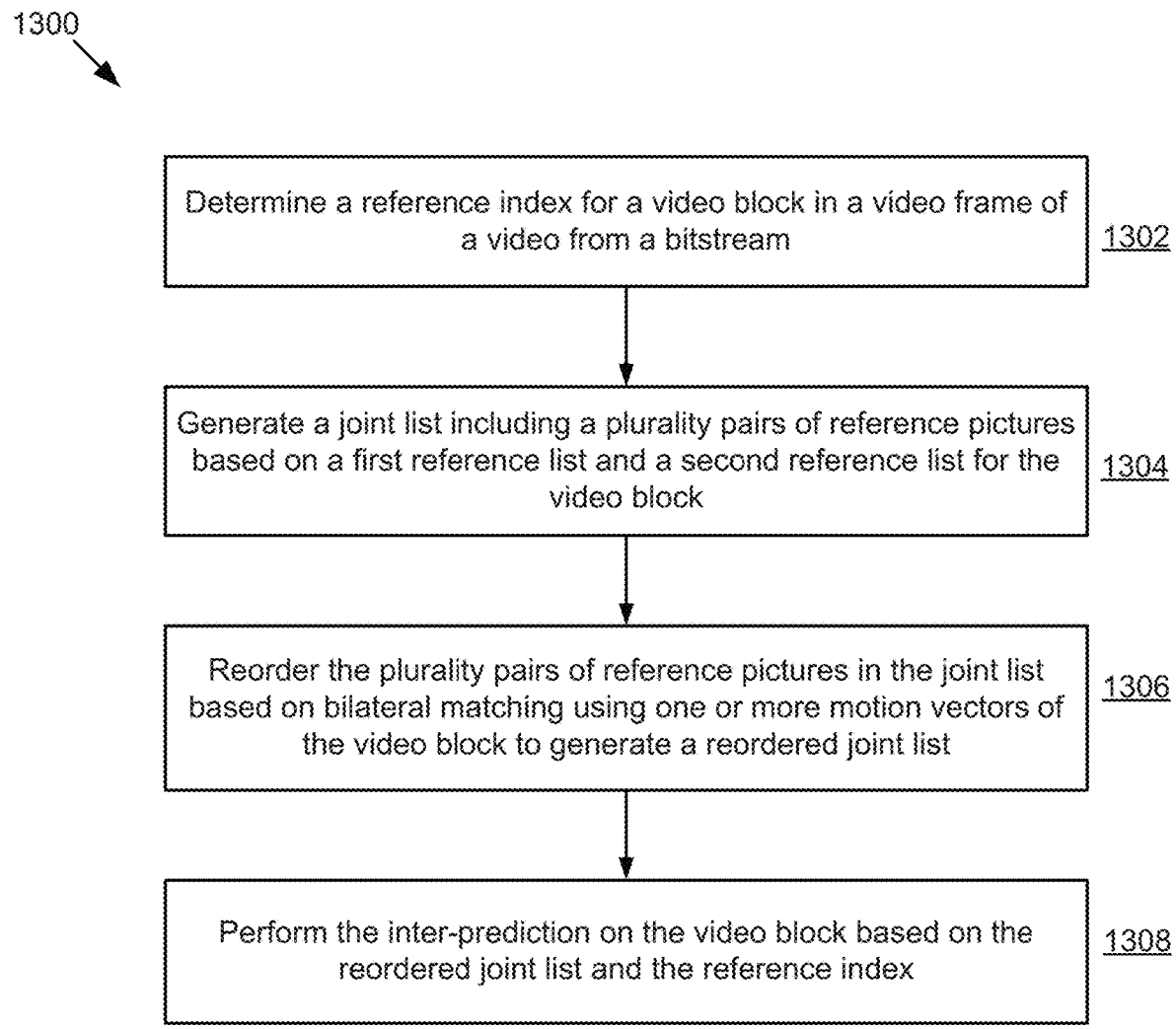
FIG. 13 is a flow chart of an exemplary method for inter-prediction on a decoder side in accordance with some implementations of the present disclosure.

FIG. 13 is a flow chart of an exemplary method 1300 for inter-prediction on a decoder side in accordance with some implementations of the present disclosure. Method 1300 may be implemented by a processor associated with video decoder 30, and may include steps 1302-1308 as described below. Some of the steps may be optional to perform the disclosure provided herein. Further, some of the steps may be performed simultaneously, or in a different order than shown in FIG. 13.

In step 1302, the processor may determine a reference index for a video block in a video frame of a video from a bitstream.

In step 1304, the processor may generate a joint list including a plurality pairs of reference pictures based on a first reference list and a second reference list for the video block.

In step 1306, the processor may reorder the plurality pairs of reference pictures in the joint list based on bilateral matching using one or more motion vectors of the video block to generate a reordered joint list.

In step 1308, the processor may perform inter-prediction on the video block based on the reordered joint list and the reference index.

FIG. 14 shows a computing environment 1410 coupled with a user interface 1450. The computing environment 1410 can be part of a data processing server. The computing environment 1410 includes a processor 1420, a memory 1430, and an Input/Output (I/O) interface 1440.

The processor 1420 typically controls overall operations of the computing environment 1410, such as the operations associated with display, data acquisition, data communications, and image processing. The processor 1420 may include one or more processors to execute instructions to perform all or some of the steps in the above-described methods. Moreover, the processor 1420 may include one or more modules that facilitate the interaction between the processor 1420 and other components. The processor may be a Central Processing Unit (CPU), a microprocessor, a single chip machine, a Graphical Processing Unit (GPU), or the like.

The memory 1430 is configured to store various types of data to support the operation of the computing environment 1410. The memory 1430 may include predetermined software 1432. Examples of such data includes instructions for any applications or methods operated on the computing environment 1410, video datasets, image data, etc. The memory 1430 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1440 provides an interface between the processor 1420 and peripheral interface modules, such as a keyboard, a click wheel, buttons, and the like. The buttons may include but are not limited to, a home button, a start scan button, and a stop scan button. The I/O interface 1440 can be coupled with an encoder and decoder.

In an embodiment, there is also provided a non-transitory computer-readable storage medium comprising a plurality of programs, for example, in the memory 1430, executable by the processor 1420 in the computing environment 1410, for performing the above-described methods. In one example, the plurality of programs may be executed by the processor 1420 in the computing environment 1410 to receive (for example, from the video encoder 20 in FIG. 2) a bitstream or data stream including encoded video information (for example, video blocks representing encoded video frames, and/or associated one or more syntax elements, etc.), and may also be executed by the processor 1420 in the computing environment 1410 to perform the decoding method described above according to the received bitstream or data stream. In another example, the plurality of programs may be executed by the processor 1420 in the computing environment 1410 to perform the encoding method described above to encode video information (for example, video blocks representing video frames, and/or associated one or more syntax elements, etc.) into a bitstream or data stream, and may also be executed by the processor 1420 in the computing environment 1410 to transmit the bitstream or data stream (for example, to the video decoder 30 in FIG. 3). Alternatively, the non-transitory computer-readable storage medium may have stored therein a bitstream or a data stream comprising encoded video information (for example, video blocks representing encoded video frames, and/or associated one or more syntax elements etc.) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 1420); and the non-transitory computer-readable storage medium or the memory 1430 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1430, executable by the processor 1420 in the computing environment 1410, for performing the above-described methods. For example, the computer program product may include the non-transitory computer-readable storage medium.

In an embodiment, the computing environment 1410 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video processing method for inter-prediction performed by a video decoder, comprising:
   determining a reference index for a video block in a video frame of a video from a bitstream;
   generating a joint list comprising a plurality pairs of reference pictures based on a first reference list and a second reference list for the video block;
   reordering the plurality pairs of reference pictures in the joint list based on bilateral matching using one or more motion vectors of the video block to generate a reordered joint list; and
   performing the inter-prediction on the video block based on the reordered joint list and the reference index.

2. The video processing method of claim 1, wherein:
   reference pictures in the first reference list have picture order counts (POCs) smaller than that of the video frame, and reference pictures in the second reference list have POCs greater than that of the video frame; or
   reference pictures in the first and second reference lists have POCs smaller than that of the video frame.

3. The video processing method of claim 1, wherein reordering plurality pairs of reference pictures in the joint list based on bilateral matching using the one or more motion vectors of the video block to generate the reordered joint list comprises:
   determining a plurality of bilateral matching costs for the plurality pairs of reference pictures, respectively; and
   reordering the plurality pairs of reference pictures according to their respective bilateral matching costs to generate the reordered joint list.

4. The video processing method of claim 3, wherein the plurality pairs of reference pictures are ordered according to an ascending order of their respective bilateral matching costs.

5. The video processing method of claim 3, wherein a bi-prediction scheme is applied in the inter-prediction for the video block.

6. The video processing method of claim 5, wherein determining the plurality of bilateral matching costs for the plurality pairs of reference pictures in the joint list respectively comprises:
   for a pair of reference pictures comprising a first reference picture from the first reference list and a second reference picture from the second reference list:
      determining a first reference block for the video block from the first reference picture based on a first motion vector of the video block;
      determining a second reference block for the video block from the second reference picture based on a second motion vector of the video block; and
      calculating a bilateral matching cost for the pair of reference pictures based on the first and second reference blocks.

7. The video processing method of claim 5, wherein performing the inter-prediction on the video block based on the reordered joint list and the reference index comprises:
   selecting a pair of reference pictures from the reordered joint list based on the reference index; and
   generating a predictive block for the video block based on the selected pair of reference pictures and a pair of motion vectors of the video block.

8. The video processing method of claim 3, wherein a uni-prediction scheme is applied in the inter-prediction for the video block.

9. The video processing method of claim 8, wherein if a random access configuration is applied in the first and second reference lists, generating the joint list comprising the plurality pairs of reference pictures based on the first reference list and the second reference list comprises:
   determining an inter-prediction direction for the uni-prediction scheme from the bitstream;
   determining a direction-consistent list to be one of the first and second reference lists based on the inter-prediction direction;
   determining a counter-direction list to be another one of the first and second reference lists; and
   generating the plurality pairs of reference pictures with each pair of reference pictures comprising a first reference picture from the direction-consistent list and a second reference picture from the counter-direction list.

10. The video processing method of claim 8, wherein if a low delay configuration is applied in the first and second reference lists, generating the joint list comprising the plurality pairs of reference pictures based on the first reference list and the second reference list comprises:
    generating the plurality pairs of reference pictures with each pair of reference pictures comprising a first reference picture from the first reference list and a second reference picture from the second reference list.

11. The video processing method of claim 8, wherein determining the plurality of bilateral matching costs for the plurality pairs of reference pictures in the joint list respectively comprises:

for a pair of reference pictures comprising a first reference picture from the first reference list and a second reference picture from the second reference list:
- determining a first reference block for the video block from the first reference picture based on a first motion vector of the video block;
- scaling the first motion vector of the video block to generate a second motion vector of the video block;
- determining a second reference block for the video block from the second reference picture based on the second motion vector of the video block; and
- calculating the bilateral matching cost for the pair of reference pictures based on the first and second reference blocks.

12. The video processing method of claim 8, wherein performing the inter-prediction on the video block based on the reordered joint list and the reference index comprises:
- selecting a pair of reference pictures from the reordered joint list based on the reference index; and
- generating a predictive block for the video block based on a first reference picture in the selected pair of reference pictures and a motion vector of the video block.

13. A video decoder apparatus for inter-prediction, comprising:

a memory configured to store a bitstream; and
a processor coupled to the memory and configured to:
- determine a reference index for a video block in a video frame of a video from the bitstream;
- generate a joint list comprising a plurality pairs of reference pictures based on a first reference list and a second reference list for the video block;
- reorder the plurality pairs of reference pictures in the joint list based on bilateral matching using one or more motion vectors of the video block to generate a reordered joint list; and
- perform the inter-prediction on the video block based on the reordered joint list and the reference index.

14. A non-transitory computer-readable storage medium having stored therein a bitstream and instructions which, when executed by a processor of a video decoder, cause the processor to perform a video processing method for inter-prediction, the video processing method comprising:

- determining a reference index for a video block in a video frame of a video from the bitstream;
- generating a joint list comprising a plurality pairs of reference pictures based on a first reference list and a second reference list for the video block;
- reordering the plurality pairs of reference pictures in the joint list based on bilateral matching using one or more motion vectors of the video block to generate a reordered joint list; and
- performing the inter-prediction on the video block based on the reordered joint list and the reference index.

* * * * *